(Model.)
E. L. YOUNG & L. DYER.
AXLE LUBRICATOR.
No. 272,398. Patented Feb. 13, 1883.
*fig 1.*
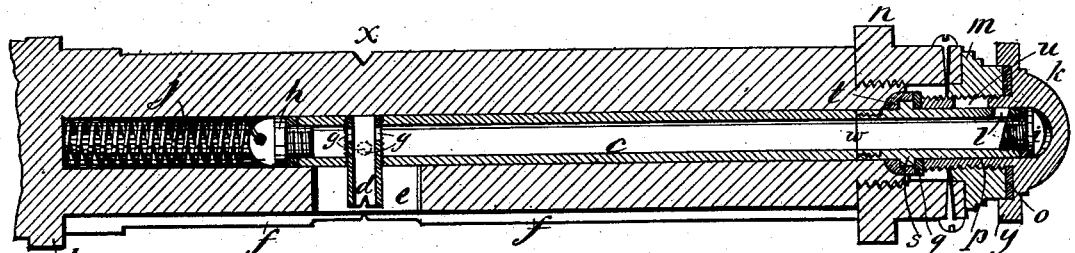
*fig 2.*  *fig 3.*
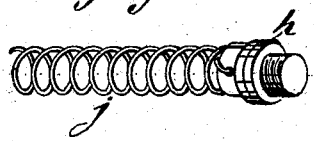 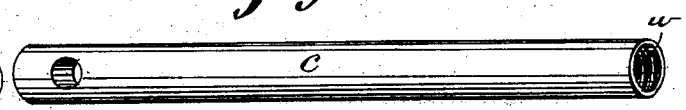
*fig 4.*  *fig 5.*
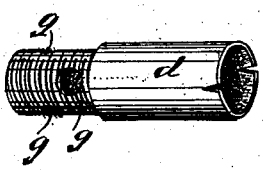 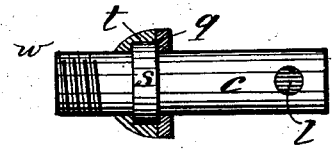 
*fig 6.*
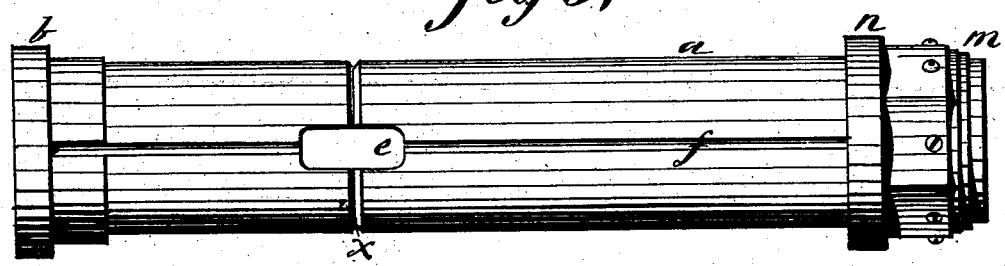
*fig 7.*
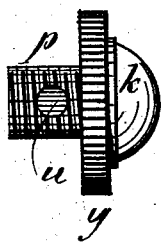
WITNESSES:
Chas. T. Howell,
C. Sedgwick.
INVENTOR:
E. L. Young
L. Dyer
BY Munn & Co
ATTORNEYS.

UNITED STATES PATENT OFFICE.

EDMUND L. YOUNG AND LUCIUS DYER, OF MILLBRIDGE, MAINE.

AXLE-LUBRICATOR.

SPECIFICATION forming part of Letters Patent No. 272,398, dated February 13, 1883.

Application filed December 27, 1882. (Model.)

*To all whom it may concern:*

Be it known that we, EDMUND L. YOUNG and LUCIUS DYER, both of Millbridge, in the county of Washington and State of Maine, have invented a new and useful Improvement in Axle-Lubricating Devices, of which the following is a full, clear, and exact description.

Our invention consists of a device for lubricating the axle of a wagon or other like vehicle without removing the wheel, and being contrived to retain the lubricant longer than in the common arrangement, the said device consisting essentially of a tube located in an axial hole of the axle-tree, with contrivances for opening and closing the outer end of the tube for supplying the oil and securing it therein, together with other contrivances to facilitate the use of the said improved lubricating device, all as hereinafter fully described.

Reference is to be had to the accompanying drawings, forming part of this specification, in which similar letters of reference indicate corresponding parts in all the figures.

Figure 1 is a longitudinal sectional elevation of a carriage-axle provided with our improved lubricating device. Fig. 2 is a perspective view of a spring and plug employed in connection with the inner end of the lubricating-tube. Fig. 3 is a perspective view of the longer section of said lubricating-tube. Fig. 4 is a perspective view of a branch tube for conducting the lubricant through the side of the axle into the axle-box. Fig. 5 is a side elevation of a section of the oiling-tube, and a plug for the outer end of the tube; also a section of packing employed to prevent the escape of oil out of the nut by which the wagon-wheel is secured on the axle. Fig. 6 is a side view of the axle with our improved lubricating device applied to it, and Fig. 7 is a side elevation of the screw-cap employed to close the lubricating-tube.

We make an axial hole in the axle $a$, from the outer end about as deep as to the shoulder $b$, and of suitable size to receive a lubricating-tube, $c$, of approved size for the capacity required, and fit such a tube therein to receive and hold the lubricating material, with or without absorbent material, and to supply the lubricant through a branch tube, $d$, to the axle-box through a slot, $e$, extending from the bore of the axle through the lower side of the axle, where the axle-box has a groove, $f$, extending along it to allow the lubricant to flow along the box. The branch tube $d$ is made to extend entirely across the tube $c$ and screw into the opposite side for a more substantial connection of said branch tube $d$, which has small holes $g$ through its sides to admit the lubricant to the absorbent material packed in said tube. The inner end of the lubricating-tube is closed with a plug, $h$, and the outer end is closed with a plug, $i$, which plugs are to be removed from time to time when it may be required to wipe out the tube and clean it of any matters depositing in it.

Back of the inner end of the lubricating-tube, which does not extend to the inner end of the bore of the axle, there is a coiled spring, $j$, that is employed for thrusting the other end of the tube out of the axle a little for convenience of pouring in the oil when the cap $k$ is removed, the object being to project said tube far enough to extend the filling-hole $l$ beyond the washer $m$, which forms the ornamental tip of the nut $n$ employed to secure the wheel on the axle. The cap $k$ has a packing-ring or washer, $o$, let in a groove in the face, to be drawn tightly against the end of washer $m$ by the hollow screw-threaded sleeve $p$, projecting from the inner face of cap $k$ and screwing into said washer $m$. This sleeve $p$ packs at the inner end against the washer $q$ and collar $s$ of the lubricating-tube, which pack the washer $t$ tightly against the outer end of the axle, so that the lubricant cannot escape from either end of the tube along it and waste at the joint of nut $n$ with the end of the axle. The screw-threaded sleeve $p$ of the cap $k$ has a hole, $u$, through which the oil or other lubricating material is to be poured, for filling the tube $c$ when the cap $k$ is screwed back sufficiently and set so that its hole $u$ coincides with hole $l$ in the tube, the latter being pushed out by the spring $j$ beyond the end of washer $m$.

To facilitate the adjustment and renewal of the packing-washer $t$ without taking out the tube $c$, we prefer to make said tube $c$ in two sections, which connect by a tight screw-joint, $w$, between collar $s$ and the tube $d$. The slot $e$ for the tube $d$ allows tube $c$ to shift forward and backward, as above described, for filling. We also make a circumferential groove, $x$, in the surface of the axle at the place where the lubricant issues from tube $d$ to facilitate the circulation of the lubricant.

The cap $k$ is provided with a milled flange, $y$, to facilitate the turning of it.

It will be seen that the tube can be filled at any time without taking off the wheel; also that the wheel may be taken off at any time when required without taking out the tube, and that the tube will receive a quantity of lubricating material sufficient for a considerable length of time, and will utilize it gradually and without waste, especially if the tubes $c$ and $d$ be packed with absorbent material.

The tube $c$ may of course be made in a single piece, dispensing with the screw-joint $w$, if desired.

Having thus described our invention, what we claim as new, and desire to secure by Letters Patent, is—

1. The combination of the lubricating-tubes $c$ and $d$ with the axle $a$, having the central bore and the lateral passage $e$, the said tube $c$ being adapted to be supplied with the lubricating material, substantially as described.

2. The combination of the tubes $c$ and $d$, spring $j$, and cap $k$ with the axle $a$, having the central bore and the lateral passage $e$, substantially as described.

3. The combination of the tubes $c$ and $d$, spring $j$, cap $k$, screw-threaded sleeve $p$, packing-collar $s$, and washers $q$ and $t$ with the axle $a$, having the central bore and the lateral passage $e$, substantially as described.

4. The combination of the washer $m$ with the nut $n$, cap $k$, sleeve $p$, lubricating-tubes $c$ and $d$, and the axle $a$, having the central bore and the lateral passage $e$, substantially as described.

5. The tube $c$, having packing-collar $s$, and tube $d$, and being made in two sections joining together at $w$, between said collar $s$ and tube $d$, in combination with hollow axle $a$ and the cap $k$, having screw-sleeve $p$, substantially as described.

6. The tube $c$, having removable end plugs, $h$ and $i$, and being arranged in the hollow axle $a$, substantially as described.

7. The combination of cap $k$, screw-sleeve $p$, and packing-washer $o$ with the washer $m$, lubricating-tubes $c$ and $d$, and the hollow and slotted axle $a$, substantially as described.

8. The combination, with axle $a$, centrally bored and fitted with plugged and packed tube $c$, having a connection, $d$, of the orifice $e$, and connecting peripheral and longitudinal distributing-grooves $x$ $f$, substantially as shown and described.

EDMUND L. YOUNG.
LUCIUS DYER.

Witnesses:
JOHN L. ALLEN,
FRED DYER.